Figure 1:
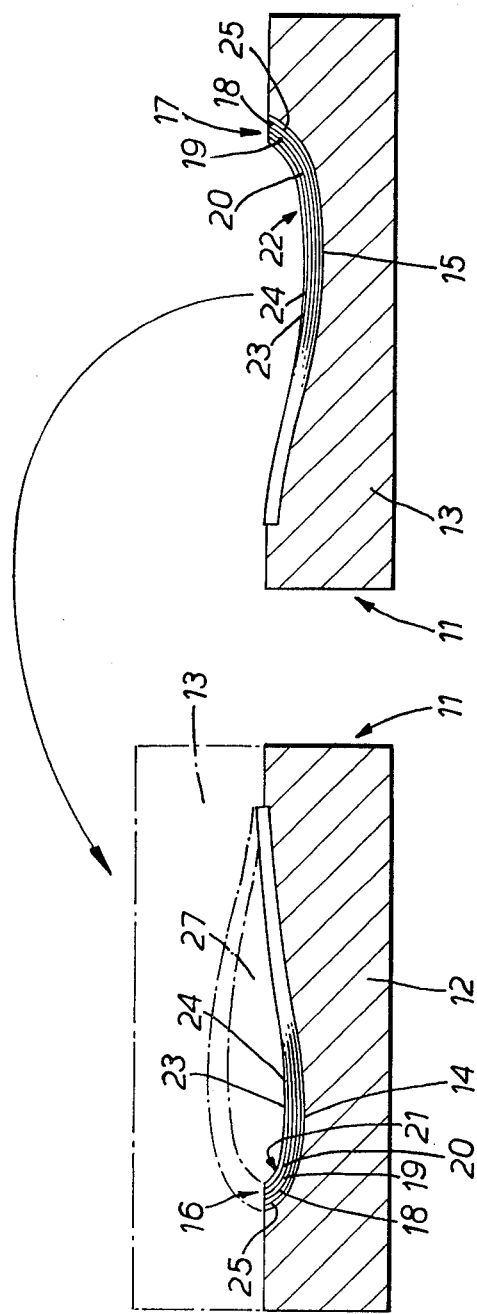

United States Patent [19]

McCarthy

[11] Patent Number: 4,471,020
[45] Date of Patent: Sep. 11, 1984

[54] FOAM-CONTAINING STRUCTURES

[75] Inventor: Roy F. J. McCarthy, Charlton Kings, England

[73] Assignee: Dowty Rotol Limited, England

[21] Appl. No.: 400,682

[22] Filed: Jul. 22, 1982

[30] Foreign Application Priority Data

Aug. 28, 1981 [GB] United Kingdom ............... 8126288

[51] Int. Cl.³ .......................... B28B 3/26; B28B 5/18
[52] U.S. Cl. .................................. 428/309.9; 156/90; 156/245; 264/46.6; 264/46.9; 264/255; 264/257; 428/71; 428/76; 428/160; 428/318.4
[58] Field of Search ......................... 156/245, 90, 305; 264/46.6, 46.9, 255, 257, 258; 428/71, 76, 160, 159, 309.9, 318.4

[56] References Cited

U.S. PATENT DOCUMENTS 3,286,004  11/1966  Hill et al. ............................ 264/45
4,268,571   5/1981  McCarthy ......................... 264/46.6
4,335,182   6/1982  Brand ................................. 428/71

Primary Examiner—Jay H. Woo
Assistant Examiner—Timothy W. Heitbrink
Attorney, Agent, or Firm—Hayes, Davis & Soloway

[57] ABSTRACT

This invention relates to a method of making a foam-containing structure which includes placing and suitably retaining a respective first shaped sheet in each of first and second complementary parts of an open mould. Each sheet includes at least one layer of fibrous material. A further respective shaped sheet is placed and suitably retained upon each first sheet. Each said further sheet comprises a layer of fibrous material and an impervious membrane adhering thereto. When the two mould parts are closed together a foamable material is introduced into a cavity formed between the sheets and is then caused to expand, whereupon each membrane is caused to adhere to its adjacent first sheet but prevents penetration of the expanding material into that sheet.

13 Claims, 5 Drawing Figures

FOAM-CONTAINING STRUCTURES

This invention relates to a method of making foam-containing structures, and to foam-containing structures, for example blades suitable for fitment to the hub of a rotor, produced by the method.

A method of making a foam-containing structure is known in which sheets of fibrous material are respectively laid in the two halves of a mould and retained therein by suitable means. The mould is then closed and foamable material is introduced into the cavity bounded by the fibrous material. The foamable material is thereafter caused to expand to provide a foam core and to penetrate the fibrous sheets in order to achieve desired bonding therewith, whereupon the fibrous sheets are subjected to a resin-injection process followed by curing of the resin so injected. However, it has been found in practice that penetration of the fibrous material by the foamable material occurs somewhat unevenly so that the resultant distribution of foamed material in the fibrous material has been far from uniform, resulting in an uneven weight distribution in the final product. Whilst such uneven weight distribution might be tolerated in certain applications of the structures so formed, in other applications such as blades for propellers and fans, where accuracy in balance is vital, such uneven distribution must be avoided.

The invention as claimed is intended to provide a remedy.

It solves the problem, experienced in the method mentioned in the last paragraph, arising from uneven penetration of material, which is being foamed, into sheets of fibrous material laid up in a mould.

According to the invention a method of making a foam-containing structure comprises; (a) placing and suitably retaining a respective first shaped sheet in each of first and second complementary parts of an open mould, each said sheet including at least one layer of fibrous material, (b) placing and suitably retaining a further respective shaped sheet upon each said first sheet, each said further respective shaped sheet comprising a layer of fibrous material and an impervious membrane adhering thereto, (c) closing said two mould parts together with said sheets still retained therein thus to define a cavity between them, (d) introducing a foamable material into said cavity, (e) causing said foamable material within said cavity to expand to a foamed state, whereupon each said membrane is caused to adhere to its adjacent said first sheet, but prevents penetration of the expanding material into that sheet, and (f) removing the formation of sheets and expanded material so produced from the mould.

Where two or more layers of fibrous material are provided on each said first sheet, a binder may be included between those layers. Preferably said binder is of powder form.

At least one further layer of fibrous material may thereafter be wrapped around said formation, and the formation, with said further layer or layers, then replaced in said mould, followed by subsequent removal therefrom.

Before the said removing of said formation of sheets and expanded material so produced from said mould, or, alternatively, before the said subsequent removal of said formation, with said further layer or layers, from said mould, said first sheets, or alternatively said first sheets and said further layer or layers, as the case may be, may be subjected to a resin-injection process which is thereafter followed by curing of the resin so injected.

Preferably each said impervious membrane is in the form of a film of flexible plastics material, for example an epoxide resin adhesive.

All of said layers of fibrous material may be of glass-fibre, or alternatively may be of carbon-fibre. Alternatively again, certain of said layers may be of glass-fibre and certain thereof of carbon-fibre.

Each said impervious membrane may be subjected to a partial curing process before it is placed, together with its respective said layer of fibrous material, upon its respective said first sheet. In this case complete curing of the material of each said impervious membrane takes place with said curing which follows said resin-injection process.

Also according to the invention there is provided a foam-containing structure produced by the method set out in the fourth paragraph herein.

The advantages afforded by the invention are mainly that a foam-containing structure is produced which has better-controlled weight distribution, which has improved bonding between the foamed material and the fibrous material, and thus which is stronger and hence more reliable in use. Also economies over previous methods of producing foam-containing structures are obtained.

Figure 2:
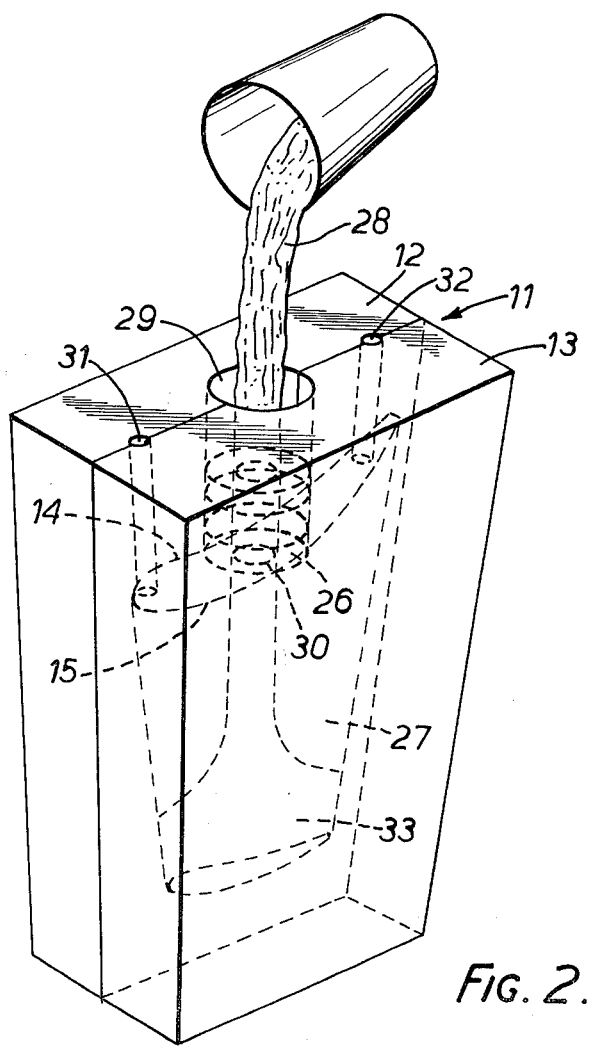
Figure 3:
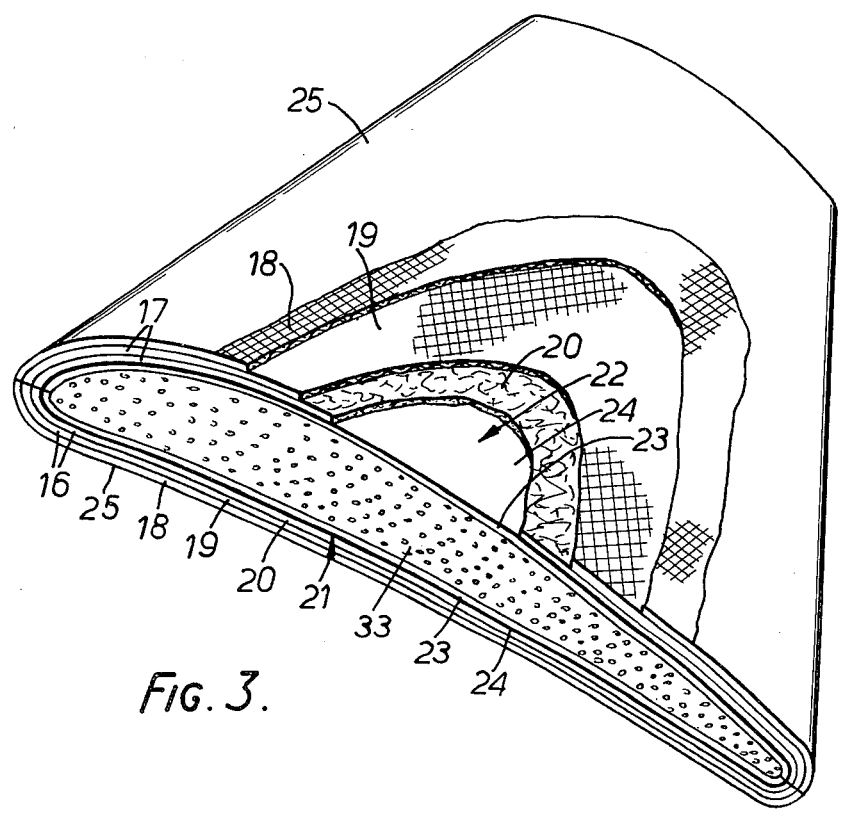
Figure 4:
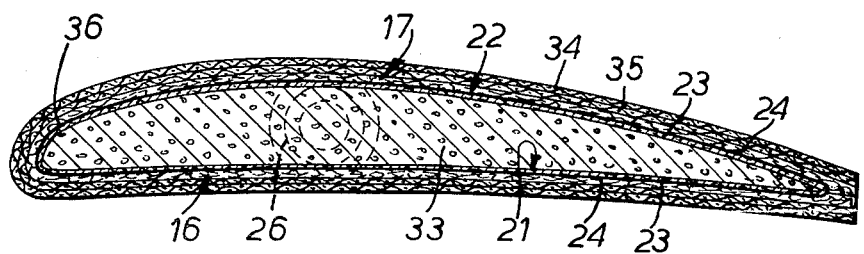
Figure 5:
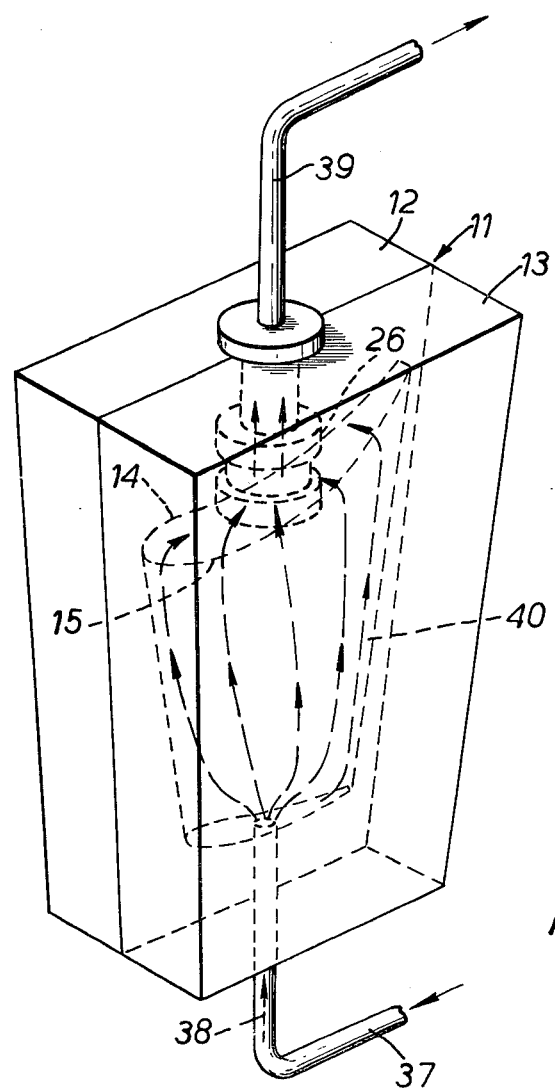

One way of carrying out the invention is described in detail below with reference to drawings which illustrate only one specific embodiment, in which:

FIG. 1 shows first and second complementary parts of a mould in the open condition each with layers of fibrous material and an impervious membrane laid therein, FIG. 2 is a perspective view of the mould parts of FIG. 1 in the closed condition and foamable material being introduced, FIG. 3 is a perspective sectional view of the structure formed in the mould and following removal therefrom, FIG. 4 is a cross-section of said structure so formed with further layers of fibrous material applied thereto, and, FIG. 5 is a perspective view of the mould parts, again in the closed condition, with said structure replaced therein together with the further layers of fibrous material and with the assembly being subjected to a resin-injection process.

In this embodiment the foam-containing structure being made is a blade for an aircraft propeller.

Referring to the drawings the single mould 11, which is to be used for making the blade, comprises first and second complementary parts 12 and 13 which are shown in the open condition in FIG. 1. These parts are of glass-fibre-reinforced plastics material and the moulding surfaces 14 and 15 thereof are wax-polished to a very smooth finish.

It is intended to lay up suitably-shaped first and preformed sheets 16, 17 of dry or substantially dry fibrous material each carrying a sacrificial scrim cloth layer 18. Each of the preformed sheets 16, 17 comprises a number of sections which have already been united at adjacent edge portions by suitably heat-bonding using a polyester binder in powder form.

The sheets 16, 17 each include one layer 19 of woven glass-fibre material held together to prevent fraying during preparatory cutting thereof by a thin chopped glass strand backing layer 20 bonded to the woven glass-fibre material by a soluble binder. This binder consists of a polyester powder which has been spread over the glass-fibre surface and the bonding having been achieved by heating to 180° C.

Laid upon each of the first preformed sheets 16, 17 is a respective further shaped sheet 21, 22. These further sheets correspond in shape to the sheets 16, 17 and each comprises a layer 23 of woven glass-fibre material having an impervious membrane 24. The two membranes are respectively in engagement with the sheets 16, 17 and are in the form of an epoxide resin film adhesive.

The sheets 21, 22 have also been preformed, each membrane 24 having been bonded to its glass-fibre layer 23 by a vacuum technique on a suitable base. During such bonding the material of the membrane has been subjected to partial curing to prevent melting of the material at a subsequent stage in the process.

Each first shaped sheet 16, 17, and also each second shaped sheet 21, 22 together with its impervious membrane 24, may be of a thickness in the range of 0.010 to 0.025 inches.

As the first step in the moulding process a polyester gel 25 is applied to the surfaces 14, 15. When this gel has reached a tacky consistency the first and preformed shaped sheets 16, 17, each with its sacrificial scrim cloth layer 18, are respectively placed in the mould parts 12, 13 with each layer 18 in direct engagement with the tacky gel 25. The gel penetrates through the layers 18 to the sheets 16, 17 so that the layers 18 and the sheets 16, 17 are firmly retained with respect to the surfaces 14, 15 by the gel.

The further and preformed shaped sheets 21, 22 are respectively placed on top of the sheets 16, 17 with the partially-cured impervious membrane 24 engaging those sheets.

An aluminium spool-like member 26, intended to form a root portion by which the blade when finished will be mounted in a hub, is now introduced to the mould 11 and the two parts 12, 13 thereof are closed together as shown in FIG. 2. Since the sheets 16, 21; 17, 22 are still firmly retained with respect to the surfaces 14, 15, a cavity 27 is formed between them.

A mixed polyurethane material 28, which includes a foaming agent, is next poured through an aperture 29, formed in the mould 11, and through the hollow interior 30 of the member 26 into the cavity 27. As pouring continues air in consequence displaced is permitted to escape to the atmosphere by way of vent holes 31, 32 provided in the mould. When filling of the cavity 27 and of the interior 30 of the member 26 is complete, the polyurethane material 28 is caused by the foaming agent therein to expand. This takes place at a temperature of 60° C. over a period of one hour.

During such expansion a skin tends to develop on the surface of the foam. Since the exposed surfaces of the glass-fibre layers 23 are relatively rough and since, upon expansion, the foam comes into engagement with these surfaces, the skin forming on the foam is caused by the surfaces to break up as it contacts them. On this occurring the foam commences then fully to penetrate, and to become keyed to, those glass-fibre layers 23. However, since the material of the impervious membranes 24 has already been partially cured, melting of the membranes to a liquid state during the foaming operation will not occur and thus the membranes provide a barrier which prevents foam from passing from the layers 23 into the sheets 16, 17. However, the membranes do become sufficiently tacky as to cause them to adhere to the sheets 16, 17 adjacent thereto.

The mould 11 is now opened an the formation, complete with foam core 33 and member 26, is removed therefrom, the gel 25 ensuring that the surfaces 14, 15 of the mould parts 12, 13 have no parts of the sacrificial scrim cloth layers 18 adhering thereto. Since the gel penetrates through the layers 18, it facilitates the next step in the process which is the stripping of those layers completely from the woven glass-fibre layers 19. This leaves the layers 19, 20 adhering to the membranes 24 and thus held to the layers 23, and the layers 23 themselves keyed to the foam core 33.

Two further layers 34, 35 of dry or substantially dry woven glass-fibre material are now wrapped around the formation, providing continuity of material as shown in FIG. 4 around the portion indicated at 36 which will form the leading edge portion of the finished blade. These two layers 34, 35 are each of a thickness in the range 0.010 to 0.025 inches.

Following removal of any residual gel 25 from the surfaces 14, 15 of the mould parts 12, 13, the assembly as shown in FIG. 4 is placed in the mould with the outermost layer 34 in direct engagement with those surfaces. FIG. 5 shows the re-closed mould 11 with an inlet pipe 37 which is connected to the lower end of the mould and which is arranged to receive an epoxide resin 38 under pressure from a suitable source (not shown). An outlet pipe 39 is taken from the upper end of the mould to a vacuum pot (not shown).

The mould is now suitably sealed and the arrangement is such that upon epoxide resin 38 being next introduced under pressure into the pipe 37, the layers 19, 20, 34 and 35 are subjected to a resin-injection process, surplus resin passing out from the mould through the pipe 39 to the vacuum pot. Immediately following this resin-injection process, curing of the resin is effected at a temperature of 60° C. over a period of sixteen hours. During this curing the material of the impervious membranes 24 becomes fully cured. Further, the resin injected reaches the membranes and forms a strong and reliable bond therewith. However, due to the presence of the membranes no resin so injected can reach the layers 23 and foam core 33.

Following curing of the resin the mould 11 is re-opened and the finished blade 40 is removed therefrom. Since the surfaces 14, 15 of the mould parts 12, 13 have a very smooth finish, removal of the blade so formed from the mould is accomplished with ease and the resultant external surfaces of the blade are very smooth.

Since only one mould is required for so producing the blade, production costs are reduced as compared with processes in which a foam core, requiring its own special mould, is preformed and fibrous layers laid up thereon before placing in a further mould.

Also since penetration of foaming material 28 is permitted fully into the layers 23 and thus right up to the smooth boundary defined by the impervious membranes 24, yet penetration of foaming material beyond that smooth boundary into the layers 19, 20 is prevented by those membranes, substantially even weight distribution in the finished blade is achieved. Further, since uneven concentrations of foam material in the blade structure are thus avoided, a relatively strong fibrous-reinforced plastics blade structure is achieved.

The invention is not limited to the numbers of layers of fibrous material of the embodiment above-described with reference to the drawings, as in other embodiments other suitable numbers of said layers may with advantage be used.

Again, instead of providing layers of woven fibrous material, in alternative embodiments layers of uni-directional fibrous material, or, a combination of woven fibrous material and uni-directional fibrous material, suitably held together, may be used.

Further, the process may include other steps, for example those necessary for including a reinforcing spar or spars in the structure, said spar or spars being of fibrous-reinforced plastics material or of other suitable material.

Yet again none of the fibrous material used in the formation of the foam-containing structure need be glass-fibre as in other embodiments other suitable fibrous material, for example carbon-fibre material, may instead be used. Alternatively in some methods in accordance with the invention the materials used may include both glass-fibre and such other suitable fibrous material.

Although in the embodiment above-described with reference to the drawings the formation is removed from the mould following expansion of the foamable material to enable further fibrous layers to be applied to the formation, followed by replacement in the mould for the resin-injection step, in other embodiments of the invention the formation is not so removed from the mould for the application of such further layers and thus the resin-injection step can then immediately follow the expansion of the foamable material, or, alternatively, the resin-injection step may be omitted.

Finally, although in the embodiment above-described with reference to the drawings parting of the formation from the mould following expansion of the foamable material is facilitated by the use of a gel and sacrificial scrim cloth layers, in other embodiments other parting agents may be used but these may require other means, for example vacuum means, for effecting positive retention of the fibrous layers in the mould parts until expansion of the foamable material has been completed.

I claim:

1. A method of making a foam-containing structure comprising: (a) placing and suitably retaining a respective first shaped sheet in each of first and second complementary parts of an open mould, each said sheet including at least one layer of fibrous material, (b) placing and suitably retaining a further respective shaped sheet upon each said first sheet, each said further respective shaped sheet comprising a layer of fibrous material and an impervious membrane adhering thereto, (c) closing said two mould parts together with said sheets still retained therein thus to define a cavity between said sheets (d) introducing a foamable material into said cavity, (e) causing said foamable material within said cavity to expand to a foamed state, whereupon each said impervious membrane is caused to adhere to its adjacent said first sheet, but prevents penetration of the expanding material into that sheet, and (f) removing the formation of sheets and expanded material so produced from the mould.

2. A method as claimed in claim 1, wherein at least two layers of fibrous material are provided in each said first shaped sheet and a binder is included between said layers.

3. A method as claimed in claim 2, wherein said binder is of powder form.

4. A method as claimed in claim 1, wherein at least one further layer or layers of fibrous material is thereafter wrapped around said formation, and the formation, with said further layer or layers is then replaced in said mould, followed by subsequent removal from said mould.

5. A method as claimed in claim 4, wherein before the said removing of said formation of sheets and expanded material together with said further layer or layers from said mould, said first sheets and said further layer or layers are subjected to a resin-injection process which is thereafter followed by curing of the resin so injected.

6. A method as claimed in claim 1, wherein before the said removing of said formation of sheets and expanded material so produced from said mould, said first sheets are subjected to a resin-injection process which is thereafter followed by curing of the resin so injected.

7. A method as claimed in claim 1, wherein each said impervious membrane is in the form of a film of flexible plastics material.

8. A method as claimed in claim 7, wherein said flexible plastics material is an epoxide resin adhesive.

9. A method as claimed in claim 1, wherein all of said layers of fibrous material are of glass-fibre.

10. A method as claimed in claim 1, wherein all of said layers of fibrous material are of carbon-fibre.

11. A method as claimed in claim 1, wherein certain of said layers of fibrous material are of glass-fibre and certain thereof are of carbon-fibre.

12. A method of making a foam-containing structure comprising: (a) placing and suitably retaining a respective first shaped sheet in each of first and second complementary parts of an open mold, each said sheet including at least one layer of fibrous material, (b) placing and suitably retaining a further respective shaped sheet upon each said first sheet, each said further respective shaped sheet comprising a layer of fibrous material and an impervious membrane adhering thereto, (c) closing said two mold parts together with said sheets still retained therein thus to define a cavity between said sheets, (d) introducing a foamable material into said cavity, (e) causing said foamable material within said cavity to expand to a foamed state, whereupon each said impervious membrane is caused to adhere to its adjacent said first sheet, but prevents penetration of the expanding material into that sheet, and (f) removing the formation of sheets and expanded material so produced from the mold, wherein each said impervious membrane is subjected to a partial curing process before it is placed, together with its respective said layer of fibrous material, upon its respective said first sheet.

13. A foam-containing structure produced by the method set out in claim 1.

* * * * *